United States Patent [19]

Imanishi et al.

[11] Patent Number: 4,525,757
[45] Date of Patent: Jun. 25, 1985

[54] ROTARY HEAD ASSEMBLY

[75] Inventors: Kiyokazu Imanishi, Higashiosaka; Takashi Ichiyanagi, Hirakata; Yasuo Sakurai, Neyagawa; Hirouki Naka, Osaka; Koji Nakagawa, Katano, all of Japan

[73] Assignee: Matsushita Electric Industrial Co., Ltd., Kadoma, Japan

[21] Appl. No.: 598,548

[22] PCT Filed: Jul. 5, 1983

[86] PCT No.: PCT/JP83/00214
§ 371 Date: Mar. 6, 1984
§ 102(e) Date: Mar. 6, 1984

[87] PCT Pub. No.: WO84/00438
PCT Pub. Date: Feb. 2, 1984

[30] Foreign Application Priority Data

Jul. 6, 1982 [JP] Japan .................................. 57-117168
Apr. 18, 1983 [JP] Japan .................................... 58-68700

[51] Int. Cl.³ .................. G11B 15/60; G11B 5/008; G11B 15/64; B65N 17/32
[52] U.S. Cl. ................... 360/130.24; 360/90; 360/102; 360/129; 226/97
[58] Field of Search ........... 360/130.24, 130.2, 130.21, 360/130.22, 130.23, 102, 107, 128, 129, 104, 90; 226/97

[56] References Cited

U.S. PATENT DOCUMENTS

| 4,012,792 | 3/1977 | Bloom | 226/97 |
| 4,257,076 | 3/1981 | Shimizu | 360/130.24 |
| 4,266,255 | 5/1981 | Camras | 360/130.24 |
| 4,395,745 | 7/1983 | Aarts | 360/129 |

Primary Examiner—Robert M. Kilgore
Attorney, Agent, or Firm—Wenderoth, Lind & Ponack

[57] ABSTRACT

This invention relates to a rotary head assembly in which a magnetic tape runs while being would helically, consisting of a fixed cylinder 21 having a fixed cylindrical part, and a rotatable rotary member 19 having a diameter approximately equal to that of said fixed cylinder 21, being disposed coaxially with a very small gap and holding a magnetic head 29, wherein pump-out type spiral grooves 20 are provided either partly or wholly on either plane of the confronting planes formed in the relative rotating part between said fixed cylinder 21 and said rotary member 19 in order to create a buoyancy on a running magnetic tape by air pressure not only in the rotary cylinder area but also in the fixed cylinder area, to realize a stable and smooth tape running, and to radically eliminate the tape chirping phenomenon, sticking phenomenon, and tape damage and cylinder wear accompanying sliding.

1 Claim, 13 Drawing Figures

ROTARY HEAD ASSEMBLY

FIELD OF THE INVENTION

This invention relates to a rotary head assembly of a video tape recorder (hereinafter called VTR), and is more particularly intended to present a rotary head assembly capable of recording and reproducing picture images of high quality at high reliability, by lifting the tape up from the cylinder with the dynamic pressure built up by pump-out type spiral grooves so as to lessen the tape running load, tape damage and wear of the cylinder itself due to sliding and friction of the tape and also to stabilize the tape running.

BACKGROUND OF THE INVENTION

A rotary head assembly of a VTR is generally composed of an upper rotary cylinder 2 and a lower fixed cylinder 3 as shown in FIG. 1, and a magnetic tape runs at a constant speed being helically wound around the rotary head assembly of about 180°. Numeral 4 refers to a step part (called lead hereinafter) which guides the running position of the tape in its widthwise direction. A video head 5 is fixed to the upper rotary cylinder 2 and rotates at high speed (1800 rpm in the VHS system VTR) to record and reproduce picture signals on the magnetic tape. Numerals 6, 7, 8, 9 are tape guide posts.

The behavior of magnetic tape on the rotary head assembly having such constitution appears to be simple, but is actually extremely complicated. FIG. 2 is a schematic model representing a sectional view of a conventional rotary head assembly and the behavior of magentic tape 1 on it. Since the upper rotary cylinder 2 rotates at high speed, an air film is formed between the tape 1 and the outer circumference of the upper rotary cylinder 3 due to inclusion of air, so that the tape 1 receives a buoyancy in the upper rotary cylinder area. In the lower fixed cylinder area, on the other hand, since the relative speed between the magnetic tape 1 and the outer circumference of the lower fixed cylinder 3 is extremely small (11.0 mm/sec in 6 o'clock mode of VHS system VTR), such air film is not formed, and the magnetic tape 1 slides while contacting with the outer circumference of the lower fixed cylinder. Meanwhile, the magnetic head 5, in order to exchange signals with the magnetic tape 1, slides at high speed on the magnetic tape at an adequate contact pressure. Therefore, on the rotary head assembly, the magnetic tape is subject to a buoyancy in the upper rotary cylinder area and runs almost without contact, whereas, in the lower fixed cylinder area, the tape runs while receiving a sliding frictional resistance. That is, the dynamic situations vary significantly depending on the position of the tape in its widthwise direction. Further, since the magnetic tape is wound around the rotary head assembly helically, its dynamic situations vary also in the longitudinal direction of the tape. In particular, at the contact terminal end between the magnetic tape and rotary head assembly, the contact surface area with the lower fixed cylinder is increased, and the tape buoyancy is inferior. Yet, the upper rotary cylinder and lower fixed cylinder are assembled almost coaxially, but the dynamic state of the tape differs significantly depending on the coaxiality and the difference in diameter of the two cylinders. In FIG. 2, numeral 11 is a shaft, on which the upper rotary cylinder 2 is fixed by way of a disc 10. Numerals 12, 13 are ball bearings which rotate and support said shaft, 15 is a spacer, and 14 is a collar to fix the ball bearings by preloading.

Thus, the magnetic tape runs on the rotary head assembly under complicated dynamic state, but involves the following problems. That is:

(1) Tape chirping due to sliding at lower fixed cylinder—this is a kind of frictional vibration accompanying the sliding between tape and cylinder, and vibrations of about hundreds to several kilohertz occur in a running tape. This phenomenon is likely to occur when the tape running speed is low and the ambient humidity is high, which gives rise to color unevenness of picture and jitters.

(2) Sticking of tape to upper and lower cylinders—generally, coarseness of tape surface is in the order of hundreds of Å and the surface is very smooth, and the cylinder surface is also finished smoothly (to surface coarseness of 0.1 to 1 S) in order to avoid occurrence of tape damage. When two surfaces of extreme smoothness contact with each other, they tend to suck each other. In the tape running system of VTR, such tendency appears as the phenomenon of tape sticking on the rotary head assembly, which may finally disable the tape to run. This phenomenon is likely to occur in damp atmosphere.

(3) Tape damage and wear due to contact between parts of the rotary head assembly and magnetic tape—tape damage not only causes dropout of magnetic recording signals, but also accelerates the wear of sliding parts with the magnetic dust falling off, or the magnetic dust may deposit on the head gap of the video head to clog it, thereby disabling to record and reproduce.

All these problems are caused by contact and sliding of the magnetic tape on the rotary head assembly, in particular, the lower fixed cylinder.

On the other hand, in the recent downsizing trend of VTR, in order to increase the signal recording density of magnetic tape, the conventional tapes prepared by coating with magnetic powder of iron oxide or chroium dioxide together with resin binder are being gradually replaced by alloy tapes or vacuum deposition tapes as magnetic tapes. While the magnetic surface of conventional tapes is composed of resin and magnetic powder, that of these new tapes is literally a metallic surface, and the coefficient of friction due to sliding with the stainless steel increased from the conventional 0.2 to 0.5 approximately. Therefore, the above problems accompanying the sliding at the rotary head assembly where the magnetic surface slides and contacts become more serious than in the conventional tapes.

As a means to present a tape guide allowing the tape to run smoothly, the cylinder constituted as represented in FIGS. 3 A, B, C was proposed in the Japanese unexamined patent publication Sho. No. 52-24507. That is, in FIGS. 3 A, B, C, numeral 16 is an air guide hole, 17 is an air chamber formed annularly on the lower face of upper rotary cylinder 2, and 18 is multiple grooves with the either ends communicating with the air chamber 17 and the other ends reaching the outer circumference of the upper rotary cylinder 2. Therefore, when the upper rotary cylinder 2 rotates in the arrow direction, the air flowing in from the air guide hole 16 is accelerated by the centrifucal force of rotation through the air chamber 17 and is blown out from the outer circumference of the lower end face of the upper rotary cylinder 2, exerting a power to lift the tape above from the outer circumference of the tape guide thereby allowing the tape to run more smoothly. However, in the conventional example as shown in FIG. 3, nothing is mentioned about the pressure occurring due to relative movements of the lower end face of the upper rotary cylinder 2 forming the grooves 18 and the upper end face of the lower fixed cylinder on its opposing plane, that is, the effect of generation of pressure due to shearing force derived from the viscosity of air, and the grooves 18 act only as the blades of a centrifugal blower, and are only meant to lift the tape by the inertial force of the air accelerated by the centrifugal force. In this method, therefore, it is insufficient to form a desired air film between the tape and cylinder, overcoming the tape tension, and it is difficult, in particular, to avoid contact of the tape at the winding end part of the tape around the cylinder, that is, at the lower fixed cylinder near the exit of the tape.

In another conventional example, as disclosed in the Japanese unexamined patent publication Sho. No. 52-24506, a cylinder constitution was proposed to increase the pressure at the slits and promote the floating of the tape by forming slits of specified width between the upper and lower cylinders and installing pump-in grooves in the slits, but, in this case, the creation of pressure by slits occurs only in the slit area and the pressure rises continuously from the slit inlet to the groove closing end part, while the pressure between the slit inlet and the magnetic tape or cylinder is equal to the atmospheric pressure. Therefore, there is no effect to promote the floating of the magnetic tape.

DISCLOSURE OF THE INVENTION

The present invention relates to a rotary head assembly in which a magnetic tape runs while being wound helically, consisting of a fixed cylinder having a fixed cylindrical part and a rotatable rotary member having a diameter approximately equal to that of said fixed cylinder, being mounted coaxially at a very small spacing, and having a magnetic head, wherein pump-out spiral grooves are provided in part or whole of the circumference on either plane of the opposing planes formed in the relative rotating parts between said fixed cylinder and said rotary member in order to radically eliminate the tape chirping phenomenon, sticking phenomenon, and tape damage and cylinder wear due to sliding by creating a buoyance by air pressure on a running magnetic tape not only in the rotary cylinder area but also in the fixed cylinder area and realizing a stable and smooth tape running.

DESCRIPTION OF THE PREFERRED EMBODIMENTS

Figure 1:
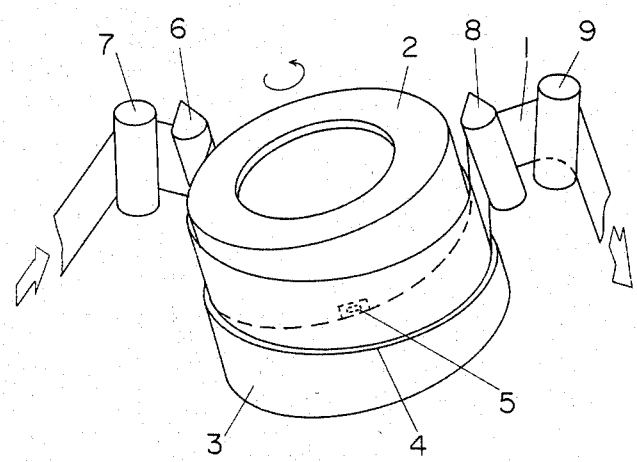
FIG. 1 is a perspective diagram of a conventional rotary head assembly.
Figure 2:
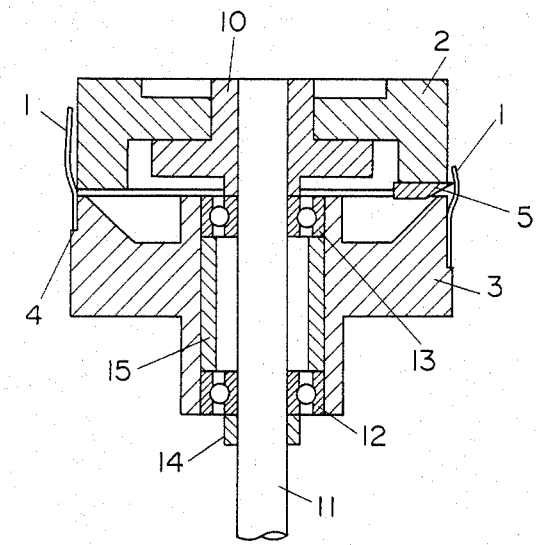
FIG. 2 is a sectional view of the same.
Figure 3:
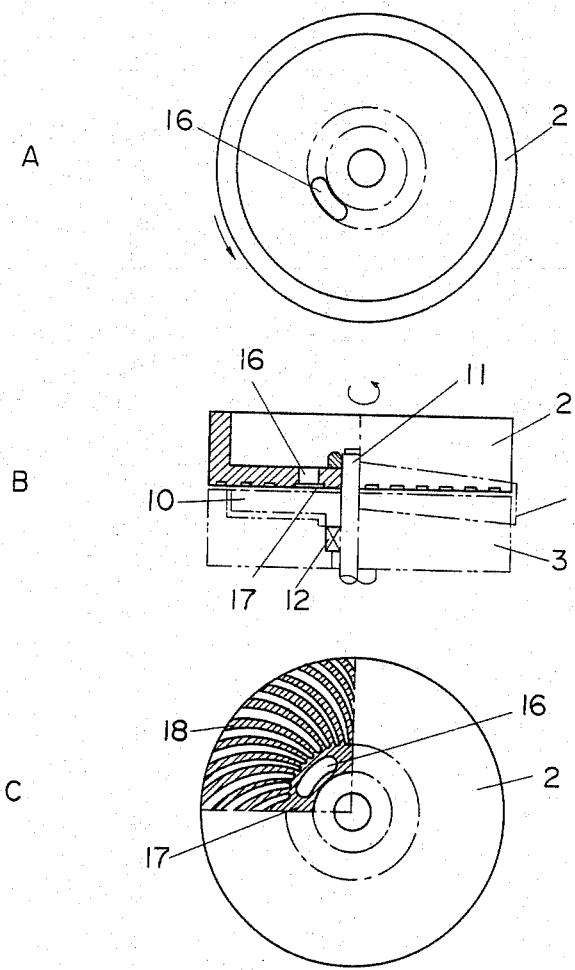
FIG. 3A is a plan view of other conventional rotary head assembly.
FIG. 3B is a front view of a partial section of the same.
FIG. 3C is a partially cutaway bottom view of the same.

The embodiments of the present invention are described below by referring to the drawings.

Figure 4:
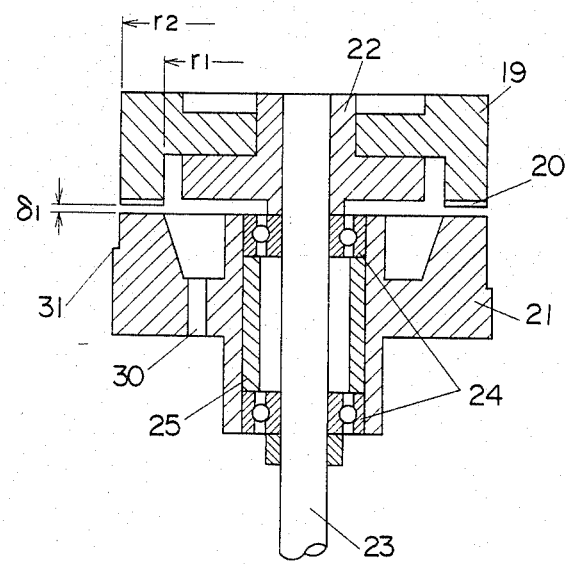
FIG. 4 is a sectional view of a rotary head assembly in one of the embodiments of the present invention.
Figure 5:
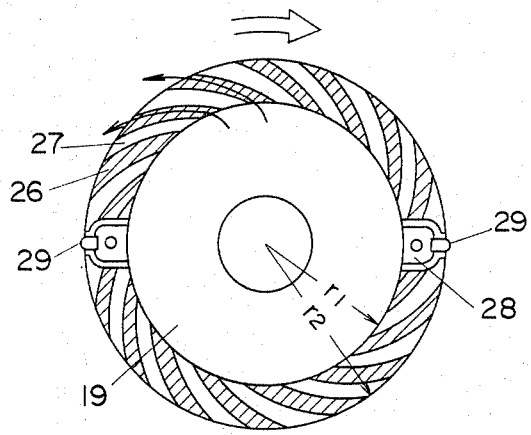
FIG. 5 is a bottom view of upper rotary cylinder of the same rotary head assembly.

FIG. 4 shows one of the embodiments of this invention, wherein pump-out type spiral grooves 20 are provided in the lower end plane of an upper rotary cylinder 19. In FIG. 4, numeral 21 is a lower fixed cylinder, 22 is a disc, 23 is a shaft, 24 is a ball bearing, and 25 is a collar to fix the ball bearing by preloading. FIG. 5 illustrates the lower end of the upper rotary cylinder in the same embodiment, wherein the pattern of spiral grooves 20 is shown. In this diagram, the shaded area represents the grooves. The spiral grooves are provided on the ring-shaped planes enclosed by concentric circles having radii $r_1$, $r_2$, wherein the shaded part 26 is the groove and 27 is the land.

When the upper rotary cylinder rotates in the direction indicated by a thick arrow, the air in the cylinder is blown out to the outside. In this drawing, numeral 28 is a head base and 29 is a magnetic head. In FIG. 4, numeral 30 denotes the hole communicating the space inside the rotary head assembly with the outside, and 31 is a lead. In the constitution of the rotary head assembly of this embodiment, the air discharged outside by the spiral groove 20 provides the magnetic tape with buoyancy, and forms a uniform air film over the entire sliding area of the magnetic tape on the outer circumference of the upper rotary cylinder and lower fixed cylinder 21, so that the sliding contact between the magnetic tape and rotary head assembly is avoided, thereby realizing a stable and smooth tape running.

Figure 6:
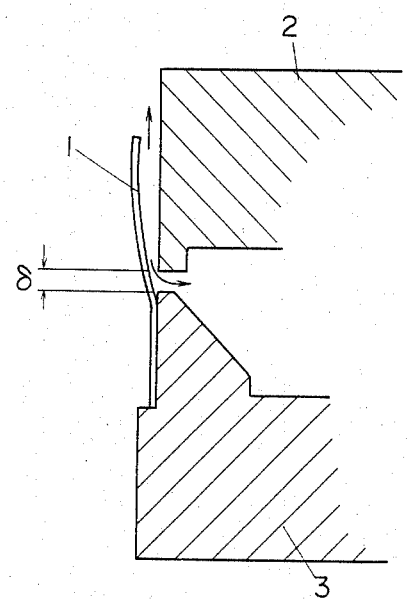
FIG. 6 is a descriptive diagram of behavior of tape on a conventional rotary head assembly.
Figure 7:
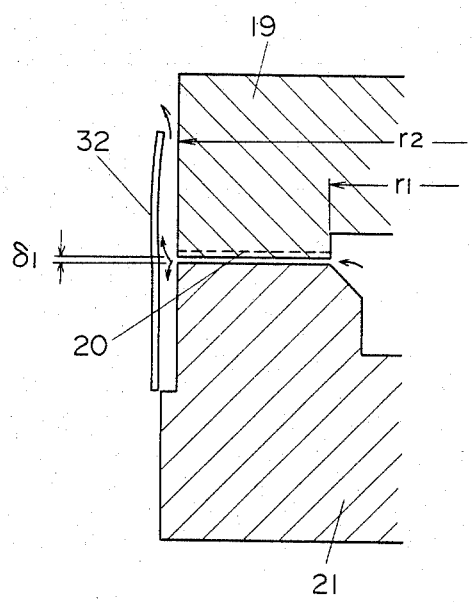
FIG. 7 is a descriptive diagram of behavior of tape on a rotary head assembly in one of the embodiments of the present invention.

Next, the principle of improvement of tape running performance in this embodiment is described in further details. FIGS. 6 and 7 demonstrate partial sectional views of the rotary head assembly of the conventional constitution and the present embodiment, respectively. In the conventional rotary head assembly, as shown in FIG. 6, the tape floats by a maximum of about 10μ in the upper rotary head assembly, while the tape is not lifted at all in the lower fixed head assembly but runs while keeping contact. This is because the air pressure due to the air bearing effect by high speed rotation of the upper rotation cylinder leaks out, as indicated by the fine arrows in the diagram, partly from the upper end of the magnetic tape 1 and the rest through a small gap between upper and lower cylinders (usually 0.1 to 1 mm), so that the air pressure does not reach the lower fixed cylinder area. In the rotary head assembly of this invention (see FIG. 7), since spiral grooves 18 are provided between the upper rotary cylinder 2 and lower fixed cylinder 3 to discharge the air to the outside, the air pressure due to rotation of said rotary cylinder does not leak out from the gap ($\delta_1$) between the upper and lower cylinders, but, to the contrary, the air pressure to lift the magnetic tape 32 is heightened by the air stream discharged from the spiral grooves, and the air pressure reaches up to the lower fixed cylinder area, so that the tape is lifted from the lower fixed cylinder and runs without contact. Incidentally, the air pressure required for lifting the tape in an ordinary VTR is about 0.01 to 0.05 atg in average. The air discharge in this invention is due to the pressure created by the relative movements of the lower end of upper rotary cylinder 19 forming grooves 20 and the upper end of lower fixed cylinder 21 on its opposing plane, that is, due to the effect of pressure creation by shearing force derived from the viscosity of air. In order to obtain this effect, the gap $\delta_1$ must be approximately 100$\mu$ or less. And the length of the spiral groove in the radial direction ($r_2-r_1$) should be as long as possible. The optimum depth of the spiral grooves depends on the gap $\delta_1$ or the length of spiral groove in the radial direction ($r_2-r_1$), but the desired effect may not be obtained unless it is about 200$\mu$ or less considering from the dimensions and specifications of the rotary head assembly of ordinary VTR, rotating speed of upper rotary cylinder, and other conditions. The shape and specifications of spiral grooves may be set by referring to known documents (for example "Design of Gas Bearings" by D. F. Wilcock, MTI, 1972).

As evident from the above, between the above Japanese Pat. 52-24507 and this invention, the principle of generation of air discharge pressure is basically different.

The present inventors, in the specification of the Japanese patent application Sho. No. 57-117168, proposed a rotary head assembly having the same constitution as in this invention, and explained, wherein, the desired effect would not be obtained unless the gap $\delta_1$ is at least 50$\mu$ or less and the spiral groove depth about 100$\mu$ or less, but disclosed, as a result of subsequent experiments and studies, a sufficient tape lifting effect would be obtained when the gap $\delta_1$ is about 100$\mu$ and the depth of spiral groove about 200$\mu$. The outline of the experiments and the results are described below by referring to FIGS. 8 to 11.

Figure 8:
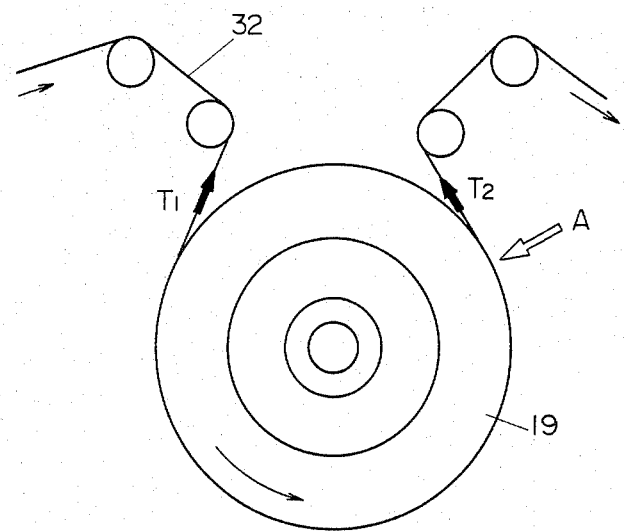
FIG. 8 is a plan view of the same rotary head assembly.
Figure 9:
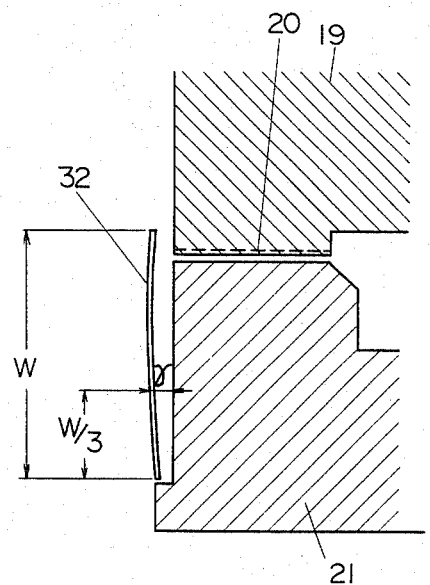
FIG. 9 is a descriptive diagram of behavior of tape near the contact end of the tape to the cylinder in the same rotary head assembly.
Figure 10:
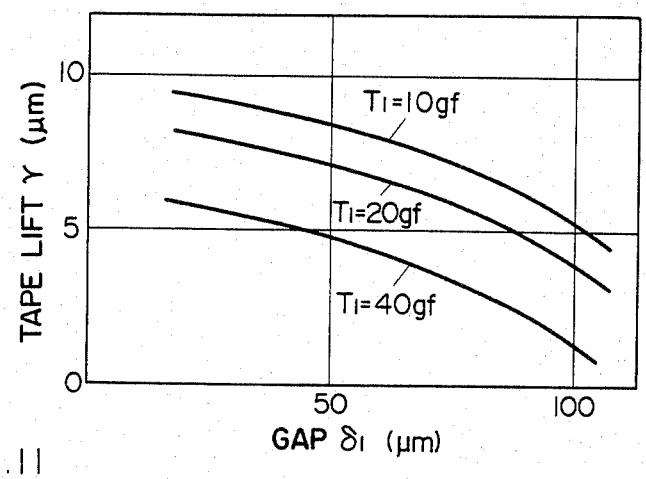
FIGS. 10 and 11 are graphs of experimental data obtained by using the same rotary head assembly.
Figure 11:
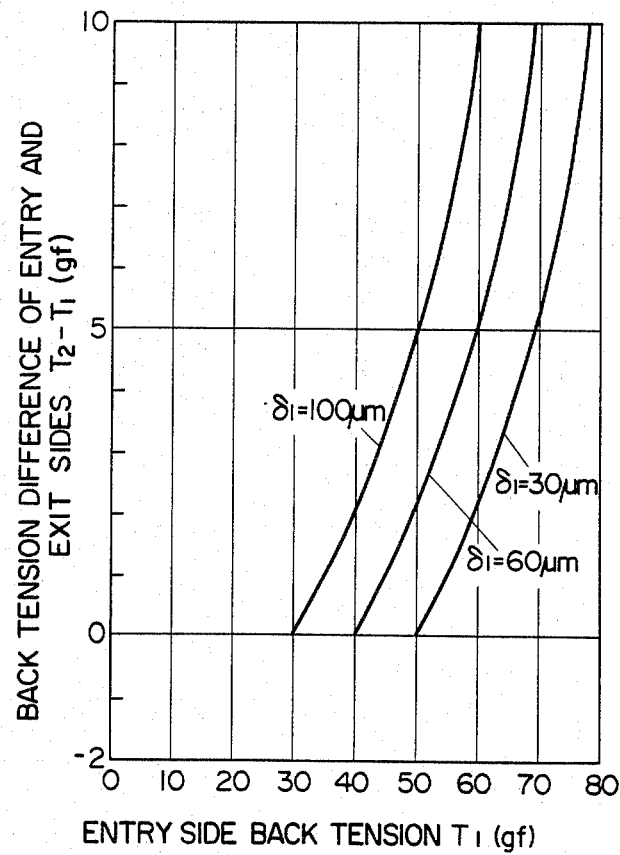

FIG. 8 is a top view of the rotary head assembly of the embodiment, wherein $T_1$ is the entry side back tension, $T_2$ is the exit side back tension, and arrow A shows the approximate position near the tape exit side obtained by measuring the lift of the magnetic tape 32 by optical sensor. FIG. 9 is a sectional view schematically representing the floating state of the magnetic tape 32 in the position indicated by arrow A in FIG. 8, and $\gamma$ in FIG. 9 denotes the lift of magnetic tape 32 at the position of w/3 from the lower end of magnetic tape 32 where w is the width of magnetic tape 32. In this experiment, the width w of magnetic tape 32 was 8 mm. FIG. 10 is a graph showing the result of measurement of tape lift $\gamma$, wherein the axis of abscissas denotes the gap $\delta_1$ and the axis of ordinates represents the tape lift $\gamma$, and the results of entry side back tension $T_1$ of 10 gf, 20 gf, 40 gf are shown. FIG. 11 is a graph showing the result of measurement of back tension of entry side and exit side, wherein the axis of abscissas denotes the entry side back tension $T_1$ and the axis of ordinates represnets the difference between exit side back tension $T_2$ and entry side back tension, and the results of measurement of gap $\delta_1$ of 30$\mu$, 60$\mu$, and 100$\mu$ are shown. In FIG. 11, when the difference of entry side and exit side back tensions $T_2-T_1$ is zero, it means the sliding friction between the magnetic tape 32 and lower fixed cylinder 21 is zero, which means that the floating of magnetic tape is kept. Therefore, when the gap $\delta_1$ is 100$\mu$, if the exit side back tension $T_1$ is 30 gf or less, it is evident that there is no sliding contact between magnetic tape and lower fixed cylinder.

Also from the tape floating data in FIG. 10, it is obvious that the tape floating is maintained as far as the gap $\delta_1$ is up to 100$\mu$ if the entry side back tension is 40 gf. However, the lift of tape $\gamma$ mentioned so far is the average per revolution of upper rotary oylinder 19, and actually fluctuates at a double frequency of the rotating speed of the upper rotary cylinder due to the effect of protrusion of magnetic head. The frictional force due to sliding contact between the magnetic head and magnetic tape is very slight, and there is almost no effect on the back tension difference $T_2-T_1$.

The depth of spiral grooves of upper rotary cylinder used in this experiment was set at 120$\mu$, and as a result of experiment with groove depth of 200$\mu$, the tape lifting effect was recognized up to the gap $\delta_1$ of 100$\mu$.

That the tape lifting effect was obtained at a larger gap than expected initially seems to be due to not only the effect of air discharge through spiral grooves but alos the synergistic action of the squeeze effect caused by protrusion of the tape by magnetic head, according to the results of subsequent studies.

In the embodiment in FIG. 7, the spiral grooves are provided at the upper rotary cylinder side, but it is evident that same effects would be obtained if provided at the lower fixed cylinder side.

The method of fabrication of spiral grooves in this invention is a kind of press forming using molds having the convex and concave shapes of the groove and land of spiral grooves to be manufactured completely inverted. That is, so-called coining process is applicable. Burrs and local buildups caused by coining may be corrected by slightly dressing by means of lathe or drinder.

Thus, in the aspect of machining, it is very simple, quick and inexpensive to manufacture spiral grooves, and requirements for mass production may be sufficiently sufficed.

In this above explanations, rotary head assemblies of upper rotary and lower fixed type have been discussed, but this invention may be equally applied to rotary head assemblies of upper and lower fixed type.

POSSIBILITIES OF INDUSTRIAL USE

As explained above, the present invention is intended to present a rotary head assembly capable of recording and reproducing picture images of high quality at high reliability by creating the buoyancy of running magnetic tape by air pressure not only in the rotary cylinder area but also in the fixed cylinder area, realizing stable and smooth tape running, and radically eliminating the tape chirping phenomenon, and tape damage and wear accompanying sliding.

We claim:

1. A rotary head assembly consisting of a fixed cylinder having a cylindrical part and a rotary cylinder, having a cylindrical part with a diameter approximately equal to that of the cylindrical part of this fixed cylinder, which rotates relatively with respect to said fixed cylinder in close contact with said fixed cylinder and supports the tape together with said fixed cylinder, wherein pump-out type spiral grooves are provided on either plane of the confronting end faces of said rotary cylinder and fixed cylinder.

* * * * *